United States Patent [19]
Dickerson

[11] Patent Number: 4,810,737
[45] Date of Patent: Mar. 7, 1989

[54] SPINNING OF SPANDEX FILAMENTS

[75] Inventor: Wilton H. Dickerson, Waynesboro, Va.

[73] Assignee: E. I. Du Pont de Nemours and Company, Wilmington, Del.

[21] Appl. No.: 121,272

[22] Filed: Nov. 16, 1987

[51] Int. Cl.$^4$ .................................................. C08K 3/22
[52] U.S. Cl. ..................... 524/251; 524/252; 524/507; 524/590; 524/726
[58] Field of Search ............ 524/251, 252, 726, 507, 524/590; 264/205

[56] References Cited

U.S. PATENT DOCUMENTS

| 3,428,711 | 2/1969 | Hunt | 525/127 |
| 4,296,174 | 10/1981 | Hanzel et al. | 524/394 |
| 4,575,527 | 3/1986 | Dixon et al. | 524/251 |

FOREIGN PATENT DOCUMENTS

| 697664 | 11/1964 | Canada | 264/205 |
| 2080349 | 2/1982 | United Kingdom | 264/205 |

Primary Examiner—Lewis T. Jacobs

[57] ABSTRACT

An improved process is provided for dry spinning spandex filaments which contain titanium dioxide pigment particles and a polymeric tertiary amine stabilizer. An organic base, such as ethylene diamine or diethyl amine, is added to the polymer solution before the titanium dioxide or the polymeric amine stabilizer is added to the solution. Improved spinning continuity and product yield are obtained.

6 Claims, No Drawings

SPINNING OF SPANDEX FILAMENTS

BACKGROUND OF THE INVENTION

Field of the Invention

This invention relates to a process for preparing spandex filaments in which a solution of the polymer contains a tertiary amine stabilizer and titanium dioxide particles. In particular, the invention concerns improvements in such a process wherein the addition of an organic base to the solution results in improved processing and product yields.

Description of the Prior Art

Spandex filaments are well known and have found considerable utility and commercial success in a large variety of fabrics. Many processes have been disclosed for the manufacture of spandex filaments from solutions of spandex polymer. Dry spinning is used extensively.

The need for special stabilizers and other agents in spandex filaments has led to inclusion of various organic and inorganic compounds in the filaments. Additives, such as fillers, pigments, plasticizers and stabilizers against degradation by oxygen, chlorine, heat, fumes or ultra-violet light, are often incorporated into the filaments by being added to the polymer solution prior to spinning. In the polymer solution, the additives may dissolve or form a slurry.

Hunt, U.S. Pat. No. 3,428,711, the entire disclosure of which is hereby incorporated by reference, describes polymeric tertiary-aminoalkyl acrylates and methacrylates, which are particularly suited for use as stabilizers and/or dye enhancers for spandex fibers. Such stabilizers (and/or dye enhancers) have been used in commercial spandex yarns for many years. Pigments, such as particles of titanium dioxide, also have long been used as whiteners for such fibers. However, the present inventor noted that dry spinning of spandex fibers from polymer solutions in which either the Hunt stabilizer or the $TiO_2$ was included alone resulted in easier processing and higher yields of satisfactory product than when both the stabilizer and the $TiO_2$ were included together. Accordingly, an object of this invention is to provide an improved process for dry-spinning spandex fibers that contain as additives, both, $TiO_2$ particles and a polymeric tertiary amine stabilizer.

SUMMARY OF THE INVENTION

The present invention provides an improved process for dry-spinning spandex filaments, wherein a polymeric, hindered tertiary amine stabilizer and acidic inorganic particles are added to a spandex polymer solution prior to spinning. The improvement of the present invention comprises adding to the polymer solution an effective amount of a soluble organic base, either before the amine stabilizer is added or before the inorganic particles are added to the polymer solution. Preferably, the inorganic particles are titanium dioxide particles and the base is an amine that provides the polymer solution with 0.04 to 1.0 gram equivalents of amine units per kilogram of titanium dioxide. Most preferably the amine is diethyl amine or ethylene diamine. In a further preferred embodiment, the titanium dioxide has a concentration in the range of 1 to 7 percent and the polymeric stabilizer is a sterically hindered, tertiary-aminoalkyl acrylate and/or methacrylate polymer, having a concentration in the range of 0.5 to 10 percent, both percentages being based on the weight of the polymer in solution. As a result of the addition of the base, dry-spinning continuity and yield of spandex filaments are improved significantly.

DESCRIPTION OF PREFERRED EMBODIMENTS

As used herein, the term "spandex" means a fiber-forming, long chain, synthetic organic polymer comprised of at least 85% of segmented polyurethane. Preferred spandex polymers for use in the present invention are those having polyether or polyester soft segments. Such polymers are well known in the art and are made by processes, such as those referred to in U.S. Pat. No. 3,428,711, Column 2, lines 26–29. The present invention is found to be most useful in improving the spinning of polyether-based spandex solutions.

Bases suitable for use in the present invention are soluble organic compounds, preferably amines, usually having a $pK_b$ in the range of about 2.5 to 5, preferably in the range of 3 to 4.2. Among suitable amine bases are ethylene diamine, diethyl amine, n-butyl amine, n-propyl amine and the like, the first two mentioned amines being the most preferred.

The concentration of soluble organic base that is effective in improving the spinnability of the spandex polymer solution and the yield of good-quality filaments, in accordance with the present invention, can vary over a wide range. When organic amines are used in accordance with the invention, some beneficial effects usually are noted when the organic amine provides as little as 0.04 gram equivalent of amine units to the polymer solution per kilogram of $TiO_2$ that is present or that will be present in the polymer solution. Provision of more than 1.0 gram equivalent of amine units per kilogram of $TiO_2$ usually is not necessary. The most preferred concentration range of amine units is 0.1 to 0.5 gram equivalent per kilogram of $TiO_2$.

The polymeric amine stabilizers that are present in the polymer solutions according to the process of the present invention are usually polymeric tertiary amines, preferably sterically hindered, tertiary-aminoalkyl acrylates and methacrylates, which have repeating units of the following formula:

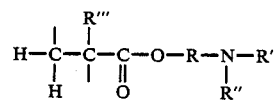

Where R is an alkylene radical containing at least two carbon atoms, R' is an alkyl radical containing at least three carbon atoms, R" is an alkyl radical and R'" is selected from the group consisting of H and $CH_3$, with R, R', and R" being selected so that (1) R' and R" together contain at least five carbon atoms and (2) the sum of the respective steric factors is at least seven. Further description of the steric values for each of R, R' and R" is given in U.S. Pat. No. 3,428,711, column 9, lines 18–31. Particularly preferred polymeric tertiary amine stabilizers with which the present invention is particularly useful include poly(diisopropylaminoethyl methacrylate) and a copolymer of diisopropylaminoethyl methacrylate and decyl methacrylate (sometimes abbreviated "DIPAM/DM"). For the copolymer, the preferred weight ratio of DIPAM to DM monomers is 75 to 25.

The titanium dioxide particles that are present in polymer solutions according to the process of the present invention whiten and/or "dull" the filaments spun from the solutions. Rutile TiO$_2$ is preferred, generally in a concentration in the range of 1 to 7%, based on the weight of the polymer. A concentration of range of 2.5 to 5% is preferred.

It is expected that if the polymeric, sterically hindered, tertiary amines were to be used with acidic inorganic particulate matter other than titanium dioxide, difficulties similar to those described above for the use of TiO$_2$ and DIPAM/DM additives, would also be encountered with the postulated system. However, it is also expected that addition of an organic base to the postulated system in accordance with the process of the present invention, would also alleviate those difficulties.

Note that the organic base must be added to the spandex polymer solution either before the acidic organic particles (e.g., TiO$_2$) or before the polymeric amine stabilizer (e.g., DIPAM/DM) is added to the solution. Alternatively, the organic base can be added to the solution before both, the TiO$_2$ and the DIPAM/DM, are added to the solution, provided that the TiO$_2$ and DIPAM/DM are added separately. These latter two additives must not be permitted to interact before being added to the polymer solution containing the organic base.

It is convenient to add the organic base in accordance with the process of the present invention to concentrated solution or slurry of the other additives in the spandex polymer solution. Of course, care must be taken to avoid contact of the TiO$_2$ additive with the polymeric amine additive before either of these additives are in the presence of the organic base (e.g., diethyl amine). Thus, care must be exercised over the order of addition of ingredients to the polymer solution. A suitable way of accomplishing this requirements is illustrated in the Example below.

Spinning spandex polymer solution containing an organic amine in accordance with the present invention, provides several improvements over spinning the same solutions under the same conditions but without the organic amine. Spinning in accordance with the present invention results in fewer curly filaments, less waste material, longer spinneret life before pluggage, and accordingly, an increase in over-all process yield. Formation of a curly or crimped spandex filament usually accompanies incipient pluggage of a spinneret. The Example which follows demonstrates these advantages.

EXAMPLE

This example illustrates the dry spinning of spandex polymer solution in a multi-position commercial machine. Each position contains sixteen spinnerets through which a polyether-based spandex polymer solution is dry spun in a conventional manner to form 44-dtex coalesced-filament yarns. Screens are located just upstream of each spinneret. The spun yarns are wound up at conventional speeds.

The dry-spinning procedure used herein was in accordance with the general procedure of Example I of Hanzel and Sauer, U.S. Pat. No. 4,296,174, column 5, line 32-66, the disclosure of which is hereby incorporated by reference. The spandex polymer was formed in N,N-dimethylacetamide (referred to as "DMAc") solvent, by reacting poly(tetramethyleneether)glycol of 1800 number average molecular weight with p,p'-methylenediphenyl diisocyanate, to form an isocyanate-terminated polyether (also called a "capped glycol"), which was then reacted with an 80/20 molar ratio of ethylene diamine and 1,3-cyclohexylenediamine chain extenders, and with diethylamine for terminating the chain extension. The molar ratio of diamine chain extenders to diethyl amine chain terminator was 6.31 and the ratio of diamine chain extenders to unreacted isocyanate in the capped glycol was 0.948. Substantially all of the amine chain extenders were reacted. The resultant spandex polymer solution contained approximately 36% solids and had a viscosity of about 2100 poises at 40° C. The polymer had an intrinsic viscosity of 0.95, measured at 25° C. in N,N-dimethylacetamide at a concentration of 0.5 gram per 100 ml of solution.

In a separate vessel, equipped with a rotating stirrer, the following were mixed in sequence:

147.8 kg of dimethyl acetamide,
0.51 kg of ultramarine blue pigment (having an average composition of Na$_5$HAl$_4$Si$_6$S$_4$O$_{24}$),
31.6 kg of "Santowhite" powder, 1,1-bis (3-t-butyl-6-methyl-4-hydroxy-phenyl) butane antioxidant,
49.44 kg of the polymer solution prepared as described in the preceding paragraph,
150.0 kg of TiO$_2$,
0.695 kg of ethylene diamine,
17.6 kg of polydimethylsiloxane silicone oil,
0.2 kg of zirconium oxide, and
212.6 kg of a copolymer of diisopropyldiaminoethyl methacrylate and n-decyl methacrylate in a 70/30 weight ratio (DIPAM/DM).

The resultant mixture, which contained 0.15 gram equivalents of amine units per kg of TiO$_2$, was then fed to the polymer solution of the preceding paragraph at such a rate that the polymer additives amounted to the following approximate percentages of the final weight of the spandex filaments spun from the polymer solution: 4.5% TiO$_2$; 6% DIPAM/DM; 1% "Santowhite" powder; 0.015% ultramarine blue; and 0.02% ethylene diamine.

For comparison, the entire procedure was repeated except that ethylene diamine was omitted from the additives. The comparison procedure duplicated the process and additives used in a conventional commercial process for making of these polyether-based spandex yarns. All weight percentages for these additives were based on the weight of the final filaments.

The advantages of operating according to the present invention, as was done in this Example, over operating in accordance with procedures of the past, as was done in the comparison procedure, is shown by the results summarized in the Table below. The following measures of spinning performance are recorded in the table:

(a) Spinneret life, the % of spinnerets originally placed into test that still function properly (i.e., do not require replacement) after a given number of hours of spinning;

(b) Percent of the spinneret changes caused by the formation of curly yarns; and (c) Number of broken threadlines per 1,000 kg of 44 dtex yarn produced.

TABLE

| Test | Example | Comparison |
| --- | --- | --- |
| % of original spinnerets operating after | | |
| 168 hours | 28.8 | 17.2 |
| 192 hours | 23.4 | 3.1 |
| 216 hours | 17.1 | 0.0 |
| 240 hours | 11.7 | 0.0 |
| 264 hours | 6.3 | 0.0 |
| 288 hours | 2.7 | 0.0 |

TABLE-continued

| Test | Example | Comparison |
|---|---|---|
| % of spinneret changes due to curly yarns | 36.1 | 76.9 |
| Threadline breaks per ton of yarn produced | 12.4 | 16.7 |

As can be seen from the preceding table, the procedure of the invention involving the addition of ethylene diamine results in significant advantages over the comparison procedure. Note that, in contrast to the comparison procedure, the procedure of the invention:

(1) had 67% more of the original spinnerets operating after 7 days of operation (168 hours);

(2) had 17% of its original spinnerets operating after 9 days (216 hours) versus none for the comparison;

(3) required fewer than half the number of spinneret changes due to the formation of curly yarns; and (4) experienced 26% fewer threadline breaks. As a result, the yield of spandex yarn of satisfactory quality was improved significantly. In addition, the operating life of the screens upstream of the spinnerets was doubled.

I claim:

1. In a process for dry spinning spandex filaments wherein a polymeric, sterically hindered tertiary aminoalkyl-acrylate and/or methacrylate stabilizer and titanium dioxide particles are added to a spandex polymer solution prior to spinning, the improvement comprising adding to the polymer solution, either before the addition of the polymeric stabilizer or before the addition of the titanium dioxide particles, an effective amount of a soluble, organic amine base that provides the polymer solution with 0.04 to 1.0 gram equivalents of amine units per kilogram of titanium dioxide.

2. A process of claim 1 wherein the gram equivalents of amine units per kilogram of titanium dioxide is in the range of 0.1 to 0.5.

3. A process of claim 1 wherein the organic base has a $pK_b$ in the range of 2.5 to 5.0.

4. A process of claim 3 wherein the $pK_b$ is in the range of 3 to 4.2.

5. A process of any one preceding claim wherein the organic base is diethyl amine or ethylene diamine.

6. A process of claim 1, 2, 3, or 4, wherein the organic base is diethyl amine or ethylene diamine, the titanium dioxide has a concentration in the range of 1 to 7 percent and the polymeric stabilizer has a concentration in the range of 0.5 to 10 percent, both percentages being based on the weight of the polymer in solution.

* * * * *